United States Patent [19]

Stroezel et al.

[11] Patent Number: 4,485,682

[45] Date of Patent: Dec. 4, 1984

[54] TRANSDUCER FOR TORQUE AND/OR ANGULAR DISPLACEMENT MEASUREMENT, ESPECIALLY IN POWER SCREWDRIVERS

[75] Inventors: Reinhold Stroezel, Leinfelden; Wilhelm W. Schwarze, Stuttgart; Karl Roll, Leinfelden; Alfred Hettich, Leinfelden-Echterdingen; Wolfgang Raidt, Neuhausen, all of Fed. Rep. of Germany

[73] Assignee: Robert Bosch GmbH, Stuttgart, Fed. Rep. of Germany

[21] Appl. No.: 424,999

[22] Filed: Sep. 27, 1982

[30] Foreign Application Priority Data

Apr. 22, 1982 [DE] Fed. Rep. of Germany ....... 3214889

[51] Int. Cl.3 .......................... G01L 3/02; G01L 5/24

[52] U.S. Cl. .............................. 73/862.36; 73/862.21; 81/467

[58] Field of Search ........... 73/862.36, 862.65, 862.33, 73/862.21, 862.23, 862.22, 862.24; 336/30, 135; 324/208, 209; 81/468, 469, 470, 429, 467; 173/12

[56] References Cited

U.S. PATENT DOCUMENTS 2,617,971 11/1952 Stack .................................... 173/12

3,729,991 5/1973 Hardway, Jr. .................... 73/862.33

3,823,608 6/1974 Pantermuehl et al. .......... 73/862.33

4,356,732 11/1982 Hachtel et al. ........... 73/862.33 OR

FOREIGN PATENT DOCUMENTS 790692 2/1958 United Kingdom ............. 73/862.33

*Primary Examiner*—Charles A. Ruehl

*Assistant Examiner*—James R. Giebel

*Attorney, Agent, or Firm*—Michael J. Striker

[57] ABSTRACT

A transducer arrangement for torque and/or angular displacement measurement, especially in power screwdrivers, operates in accordance with the eddy current principle. The transducer arrangement is constructed as a self-contained structural unit having its own transducer casing which is connected by appropriate coupling and connecting parts to the housing of the power screwdriver and to the driving and driven members of the screwdriver. A torsionally deformable member, especially shaft, is interposed between the driving and driven members, being connected thereto for joint rotation therewith. When torque is applied to the deformable member, its end portions are angularly displaced relative to one another. Two slotted members, especially sleeves, are respectively connected to the end portions of the deformable member for joint angular displacement therewith, and they influence the magnetic field in the vicinity of the deformable member in proportion to their relative angular displacement. The changes in the magnetic field are detected by an electric coil arrangement whose impedance changes accordingly, and the thus obtained signal is evaluated to obtain the magnitude of the applied torque. A cable connected to the coil arrangement and extending to the exterior of the casing through an opening provided in the latter is accommodated in a tube. The tube extends along a handgrip portion of the housing of the screwdriver to protect the hand of the user.

10 Claims, 4 Drawing Figures

TRANSDUCER FOR TORQUE AND/OR ANGULAR DISPLACEMENT MEASUREMENT, ESPECIALLY IN POWER SCREWDRIVERS

BACKGROUND OF THE INVENTION

The present invention relates to transducers in general, and more particularly to transducers which are especially suited for use in power tools, particularly in power screwdrivers, for measuring torque transmitted, or relative angular displacement occurring, between a driving and a driven member.

There are already known various constructions of transducers of the above type. In one conventional construction of the transducer, which is known, for instance, from the published German patent application DE-OS No. 29 51 148 and the corresponding U.S. Pat. No. 4,356,732, a torsionally deformable member is interposed in the chain of transmission between the motor and the driven screwdriving member. Two slotted sleeve-shaped members are connected to the end portions of this deformable member for joint angular displacement therewith about the axis of the deformable member when torsion is applied to the latter and deforms the same. As the two sleeve-shaped members are angularly displaced relative to one another, they influence the magnetic field existing at the vicinity of the deformable member so that the changes can be and are detected by appropriate equipment to obtain the extent of such angular displacement and from the same the magnitude of the torque.

As advantageous as this construction may be in some respects, it is considered in the above application by itself, and the question of its mounting on or incorporation in the housing of a power tool or the transmission train thereof is not addressed at all in this application. Experience has shown that, especially when the arrangement of this type is to be used in power screwdrivers, there are encountered various problems, especially when it is desired to obtain a construction which is advantageous from the manufacturing, and thus from the economic, point of view. In addition thereto, the problems existing in transducers proposed prior to the aforementioned German application and relating to the way in which the electric signals derived from the transducer or the detecting arrangement thereof are transmitted to suitable indicating or evaluating equipment are present in the arrangement according to this prior German application as well.

SUMMARY OF THE INVENTION

Accordingly, it is a general object of the present invention to avoid the disadvantages of the prior art.

More particularly, it is an object of the invention to provide a transducer of the type here under consideration which does not possess the disadvantages of the conventional transducers of this type.

Still another object of the present invention is to so construct the transducer of the above type as to be easily assemblable with the power tool with which it is to be used, without having to drastically alter the construction of such power tool.

It is yet another object of the invention to improve the manner in which the electric signals representative of the detected values are transmitted to the indicating and/or evaluating equipment.

A concomitant object of the present invention is so to design the transducer arrangement as to be simple in construction, inexpensive to manufacture, easy to install and use, and reliable in operation nevertheless.

In pursuance of these objects and others which will become apparent hereafter, one feature of the present invention resides in an arrangement for measuring torque transmitted, and/or relative angular displacement about an axis, between a driving and a driven member, of which the driving member is rotatably mounted on a support, especially on a housing of a power tool such as a power screwdriver, such arrangement comprising a transducer casing; a torsionally deformable member supported in said casing for rotation about a central axis thereof and having two axially spaced end portions; means for so mounting the transducer casing on the support that one of the end portions is connected to the driving member and the other to the driven member; means for influencing magnetic field in the casing in the vicinity of the deformable member, including two slotted elements so mounted one on the one end portion and the other on the other end portion of the torsionally deformable member as to share in the relative angular displacement of the end portions about the central axis when the torsionally deformable member is subjected to torsion; and means for detecting magnetic field changes in the casing which result from the relative angular displacement of the slotted elements.

A particular advantage of this construction is that it can be easily interposed into the housing or a similar support, for instance, of a power tool, or into its transmission, or can be mounted on the housing as an extension thereof, without having to change the construction of the power tool, its housing, or its transmission. As a result of the provision of the transducer or measuring arrangement with its own casing, and with coupling or connecting means which are configurated to cooperate with corresponding coupling or connecting means which are provided on the conventionally constructed power tool to begin with, it is possible in a very simple manner to supplementarily equip conventionally constructed machines or power tools not previously equipped with any transducer with the transducer arrangement of the present invention.

According to an advantageous further aspect of the present invention, the slotted elements are substantially tubular, that is, they are constructed as sleeves, and they have different diameters so as to at least partially overlap and surround one another when mounted on the deformable member. In this manner, there is obtained a construction which consumes only a minimum amount of space. Thus, a power screwdriver or a similar power tool, especially such which is constructed as a hand-held power tool, remains relatively slim and easy to hold and handle despite its provision with the transducer arrangement according to the present invention.

The aforementioned mounting means may advantageously include coupling splines on the support and on the casing, such coupling splines engaging one another to mount the casing on the support, and/or threaded connecting portions on the support and on the casing, such threaded portions being threadedly connected to one another to mount the casing on the support.

It is further advantageous when the transducer arrangement of the present invention further includes an electric connecting member, especially a cable, and when the casing has a through opening therein for the passage of the electric connecting element therethrough to the exterior of the casing. In this context, it is especially advantageous when there is further provided means for receiving the electric connecting member or cable, such receiving means extending from the opening of the casing at the exterior of the latter. Such receiving means advantageously includes or consists of a tube. This expedient is particularly advantageous when the support includes a housing having a handgrip portion, and when the tube extends at a predetermined distance from the handgrip portion of the housing along the latter. More particularly, the tube not only acccomodates the cable and thus assures unproblematical and interference or interruption free transmission of the electric signals, but also serves to protect the hand of the user gripping the handgrip portion of the housing when the tube extends in the above-mentioned fashion.

According to a further advantageous facet of the present invention, the aforementioned tube has an end portion remote from the opening provided in the casing, and a sleeve-shaped member is mounted on this end portion of the tube. Then, there is further provided a bracket which is connected to the support and to the sleeve-shaped member to support the latter on the support, and an electric receptacle or socket which is mounted on the sleeve-shaped member, electrically connected to the cable, and operative for receiving a plug of an additional cable leading away from the arrangement, preferably to the aforementioned indicating and/or evaluating equipment.

The aforementioned construction of the measuring or transducer arrangement of the present invention as a structural unit or assembly renders it possible to adjust the longitudinal tolerances within this structural unit. This virtually eliminates the possibility of measuring or detecting errors due to the axial displacement of the components of the system. The influence of axial displacement is totally eliminated when mounting at both ends is resorted to.

The novel features which are considered as characteristic of the invention are set forth in particular in the appended claims. The improved transducer arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
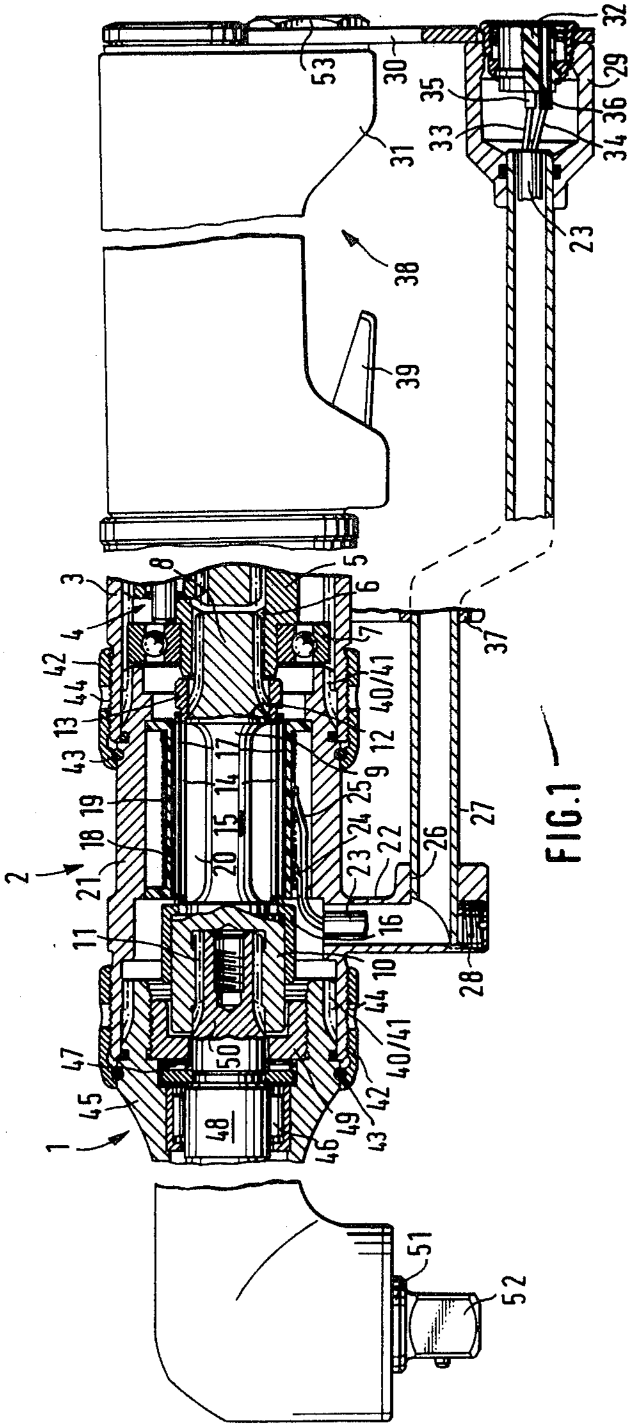
FIG. 1 is a partially sectioned side elevational view of an angular power screwdriver equipped with a transducer arrangement according to the present invention which is incorporated into the housing of the power screwdriver and into the transmission thereof.

Referring now to the drawing in detail, and first to FIG. 1 thereof, it may be seen that the reference numeral 1 has been used therein to identify an angular power screwdriver, while the reference numeral 2 denotes a transducer assembly with which the power screwdriver 1 is supplementarily equipped. The power screwdriver 1 includes a transmission housing 3 which accommodates a planetary gear transmission 4. A sleeve 5 with internal tooth or spline formations 6 constitutes an end member of the planetary gear transmission 4. An antifriction bearing 7, which is advantageously constructed as a ball bearing, supports the sleeve 5 in the transmission housing 3. The free end of the sleeve 5 which is provided with the internal formations 6 is capable of receiving an externally splined or toothed end portion 8 of a torsion shaft 9. The other end of the torsion shaft 9 is provided with a cylindrical head 10 having internal spline or tooth formations 11. The internal formations 11 of the head 10 of the torsion shaft 9 are configurated and distributed identically or similarly to the internal formations 6 of the sleeve 5 of the planetary gear transmission 4.

The torsion shaft 9 has a cylindrical support portion or land 12 which supports a slotted sleeve 13. As may be clearly seen in FIG. 3, the sleeve 13 has a plurality of longitudinally extending slots 14 that are spaced from one another in the circumferential direction of the sleeve 13. The torsion shaft 9 has a torsionally deformable section 15. The slotted sleeve 13 is so secured, especially adhesively affixed, to the support portion 12 that, as shown in FIG. 1, the part of the sleeve 13 which is provided with the slots 14 extends along the deformable section 15 at a radial distance therefrom in an overlapping relationship with the deformable section 15 of the torsion shaft 9. In a similar manner, an additional slotted sleeve 16 is supported on the cylindrical head 10 of the torsion shaft 9. As depicted in FIG. 4, the additional sleeve 16 has a plurality of longitudinally extending slots 17 which are configurated and distributed correspondingly to the slots 14 of the sleeve 13. The additional slotted sleeve 16 is so secured, especially adhesively affixed, to the head 10 of the torsion shaft 9 that, as also shown in FIG. 1, the part of the additional sleeve 16 which is provided with the slots 17 extends around and overlaps the part of the sleeve 13 which is provided with the slots 14. The sleeves 13 and 16 are so positioned relative to one another that, in the non-loaded condition of the screwdriver 1 and thus of the torsion shaft 9, the portions of the sleeve 16 which are situated between the slots 17 cover the slots 14 of the sleeve 13.

The part of the additional slotted sleeve 16 which is provided with the slots 17 is, in turn, surrounded by another sleeve 18 which carries an electrical winding or coil 19. The other sleeve 18 and the electrical winding or coil 19 together constitute a coil body. The coil body 18, 19 is secured, especially adhesively affixed, in a cylindrical internal space of a transducer housing 21. The transducer housing 21 has a connecting nipple 22 bounding a passage for receiving a portion of a cable 23 extending between the exterior and the interior of the transducer housing or casing 21. The cable 23 terminates, at one end portion thereof, in two wire leads 24 and 25 which are connected to the ends of the winding 19 carried by the other sleeve 18.

The connecting nipple 22 is provided with a receiving recess 26 for receiving an end portion of a tube 27. A screw 28 engaging in a threaded bore provided in the connecting nipple 22 serves for securely clamping the end portion of the tube 27 in the recess 26 of the connecting nipple 22. The cable 23 extends through the interior of the tube 27 toward and into an auxiliary sleeve 29. The auxiliary sleeve 29 is mounted on a bracket 30 which, in turn, is secured to one end of a machine housing 31. In addition thereto, the auxiliary sleeve supports an electric receptacle or socket 32 which serves as a plug-in connector for a compatibly configurated electric plug of a non-illustrated cable that leads away from the power screwdriver 1. The cable 23 terminates, at its end close to the auxiliary sleeve 29, in two wire leads 33 and 34 which are connected with associated contact sockets 35 and 36 of the electric receptacle 32. The tube 27 is additionally supported on the transmission housing 3 between the connecting nipple 22 and the auxiliary sleeve 29 by means of a clamping holder 37. The portion of the tube 27 which extends between the clamping holder 37 and the auxiliary sleeve 29 extends along and with a spacing from a portion 38 of the machine housing 31 which is configurated as a handgrip for the user of the screwdriver 1. The portion 38 of the machine housing 31 also supports an actuating lever 39 by means of which the screwdriver 1 can be energized or deenergized. Owing to its position relative to the housing portion 38, this portion of the tube 27 serves as a protection for the hand of the user when the same grips the portion 38.

The transmission housing 3 and the transducer casing 21 are connected to one another by means of cooperating internal and external splines or teeth 40 and 41 and a threaded connection surrounding the region of the cooperating splines 40 and 41 and including an internally threaded sleeve 42, a locking ring 43, and an externally threaded portion 44 of the transmission housing 3. The same kind of a connection, also including the cooperating external and internal splines 40 and 41, an internally threaded sleeve 42, a locking ring 43 and an external thread 44 is provided at the remote end of the transducer casing 21 for connecting the same with a spindle housing 45 of the angular screwdriver 1.

A spindle 48 is rotatably supported in the interior of the spindle housing 45 by means of a roller bearing 46 and an axial or thrust bearing 47. The axial or thrust bearing 47 is held in position in the spindle housing 45 by means of a nut 49. The nut 49 is threaded into the spindle housing 45 and has a central bore through which extends an externally splined or toothed end portion 50 of the spindle 48 to engage the internal spline formations 11 of the head 10 of the torsion shaft 9. The other end of the spindle 48 is connected, via a non-illustrated gear transmission of a conventional construction, with a driving member 51 of the angular screwdriver 1. The driving member 51 has a substantially cross-sectionally rectangular driving end portion 52 which extends to the exterior of the screwdriver 1 and which is configurated to cooperate with any of a plurality of screwdriving tools of different dimensions and/or configurations.

Figure 3:
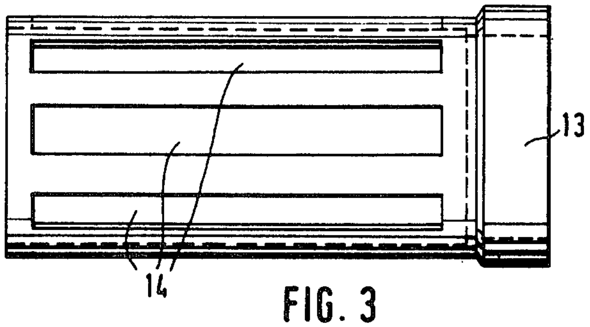
FIG. 3 is a side elevational view of an inner one of two cooperating slotted sleeves employed in either of the transducer arrangements of FIGS. 1 and 2.
Figure 4:
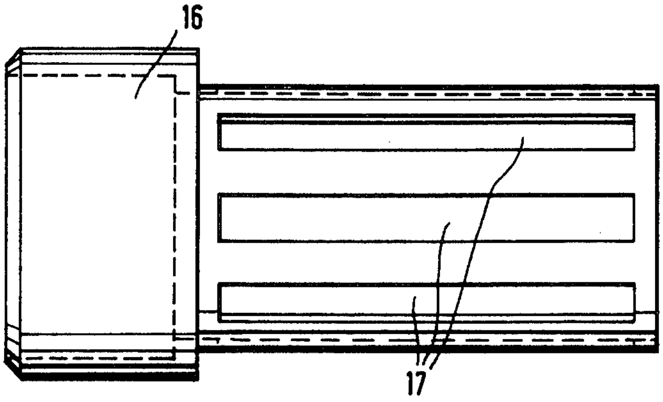
FIG. 4 is a view similar to that of FIG. 3 but depicting the outer one of the two cooperating slotted sleeves.

As already mentioned before, the slotted sleeves 13 and 16 are shown in detail in FIGS. 3 and 4, in order to be able to better illustrate the arrangement and the configurations of the slots 14 and 17 of these sleeves 13 and 16.

The machine housing 31 carries a connecting nut 53 for the connection of a pressurized air conduit or hose thereto. Such a pressurized air hose supplies pressurized air to an air motor which is accommodated in the interior of the machine housing 31 and which has been omitted from the drawing in order not to unduly encumber the same, since it is of a conventional construction.

Having so described the construction of the screwdriver 1 equipped with the transducer assembly 2 according to the present invention, the operation thereof will now be briefly explained. During the operation of the screwdriver 1, the force or torque produced by the air motor is transmitted through the torsion shaft 9 to the driving member 51. The torques occurring during the screwdriving operation result in angular displacement of the ends of the torsion shaft 9 relative to one another, due to the torsional deformation of the portion 15 of the shaft 9. As a result of this relative angular displacement of the ends of the torsion shaft with respect to one another, the slotted sleeves 13 and 16, which are secured to such ends of the torsion shaft 9, conduct at least substantially the same angular displacement relative to one another. During their relative angular displacement, the sleeves 13 and 16 change the eddy current field and thus the impedance of the coil 19 of the coil arrangement 18, 19. These changes in the impedance are fed as measured or actual values to corresponding measuring apparatus which is not shown in the drawing, using the cable 23 and the electric receptacle 32, as well as the external cable, and are evaluated at such apparatus.

As a result of the above-discussed construction of the sensing or measuring arrangement as a transducer assembly 2, it is possible to equip an already existing screwdriver 1, which heretofore operated without such equipment, with the transducer assembly 2. Due to the provision of the tube 27, there is assured transmission of the measured values without interference and without problems. Moreover, the operating hand of the user of the screwdriver 1 is efficiently protected by the tube 27 against inadvertent contact with an adjacent structure and thus possible injury.

Figure 2:
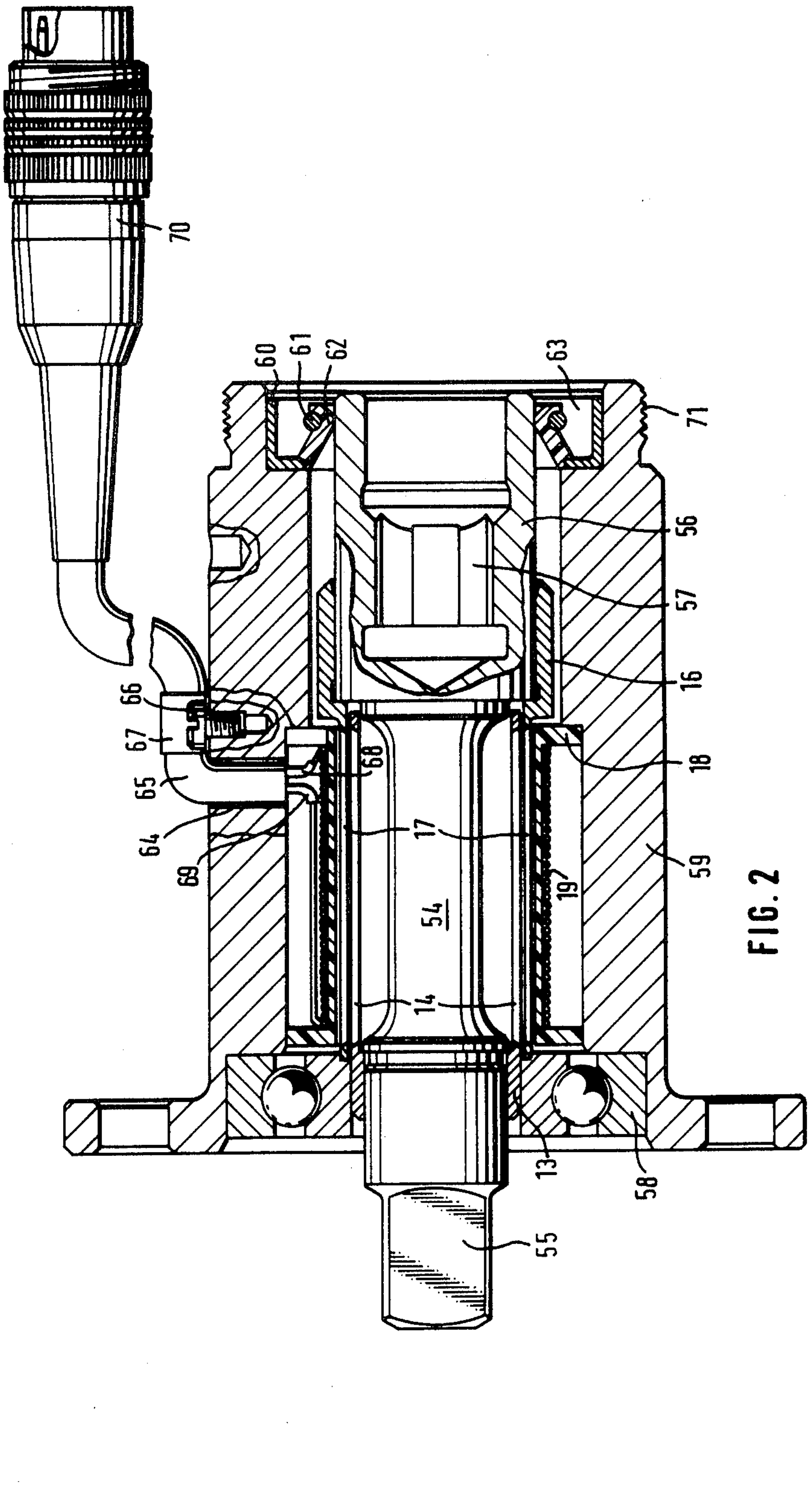
FIG. 2 is a longitudinal sectional view of a modified construction of the transducer arrangement of the present invention as embodied in a separate unit which can be mounted on the housing of the power screwdriver.

FIG. 2 illustrates a modified construction in which the same slotted sleeves 13 and 16 and the same other sleeve 18 with the coil 19 as described above are being used. However, instead of the torsion shaft 9, there is being used a torsion shaft 54 which simultaneously constitutes the driving member and the spindle and which is provided with the cross-sectionally substantially rectangular driving end portion, here identified by the reference numeral 55. The torsion shaft 54 has a head 56 in which there is formed an internal cross-sectionally hexagonal recess 57. A cross-sectionally hexagonal pin provided on a terminal member of a power screwdriver can extend into and engage in the recess 57. This has been omitted from the drawing since it is conventional.

The slotted sleeves 13 and 16 are mounted in the same manner as discussed above in connection with the torsion shaft 9. Thus, for instance, the slotted sleeves 13 and 16 may also be adhesively connected to the torsion shaft 54 at axially spaced portions of the latter. A ball bearing 58 supports the torsion shaft 54, with the slotted sleeve 13, in a transducer casing 59. The transducer casing 59 is sealed at its end closer to the driving unit of the screwdriver by sealing means 60 and 61. The sealing means 60 and 61 is accommodated in an enlarged portion of an internal passage of the transducer casing 59, this enlarged portion being denoted by the reference numeral 63. The sealing means 60 and 61 is in circumferential contact with the head 56 of the torsion shaft 54.

A radially extending bore 64 provided in the transducer casing 59 serves for the passage of a cable 65 therethrough between the interior and the exterior of the casing 59. This cable 65 is securely clamped at the exterior of the transducer casing 59 by a screw 66 and a clamping bracket 67. The cable 65 terminates, at its end situated in the interior of the transducer casing 59, in two wire leads 68 and 69 which are connected with the ends of the coil of winding 19. The wire of the winding 19 is arranged in a single layer. The other end of the cable 65 leads to an electric socket or receptacle 70, through which the signals derived from the winding 19 and supplied to the electric socket 70 through the cable 65 are transmitted in a conventional manner to appropriate measuring or evaluating apparatus.

The above-discussed structural unit constituting the transducer assembly including the transducer casing 59 can be connected via a threaded extension 71 either with the machine housing or with a transmission housing of a conventionally constructed power screwdriver or a similar power tool. Under these circumstances, the transducer assembly serves as an extension of the screwdriver.

It will be realized from the above description that the relative position of the sleeves 13 and 16 in the non-loaded condition of the screwdriver has been given by way of example only, and that any other initial position can be chosen, so long as it is assured that any change in the angular positions of the slotted sleeves 13 and 16 relative to one another will result in a corresponding change in the impedance of the coil arrangement 18, 19 and thus in a corresponding change in the measured value.

It will be understood that each of the elements described above, or two or more together, may also find a useful application in other types of arrangements differing from the type described above, especially in other types of hand-held or permanently mounted power tools.

While the invention has been illustrated and described as embodied in a hand-held power screwdriver, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. An arrangement for measuring torque transmitted, and/or relative angular displacement about an axis, between a driving and a driven member, of which the driving member is rotatably mounted on a support, especially on a housing of a power tool such as a power screwdriver, comprising a self-contained transducer unit separate from said support and including a transducer casing; a torsionally deformable member supported in said casing for rotation about a central axis thereof and having two axially spaced end portions; means for so mounting said transducer unit on said support that one of said end portions is connected to the driving member and the other to the driven member; means for influencing magnetic fields in said casing in the vicinity of said deformable member, including two slotted elements so mounted one on said one and the other on said other end portion of said torsionally deformable member as to share in the relative angular displacement of said end portions about said central axis when said torsionally deformable member is subjected to torsion, and as to be proximate to and at least partially overlap one another; and means for detecting magnetic field changes in said casing resulting from the relative angular displacement of said slotted elements.

2. The arrangement as defined in claim 1, wherein said slotted elements are substantially tubular and have different diameters so as to at least partially surround one another when mounted on said deformable member.

3. The arrangement as defined in claim 1, wherein said mounting means includes coupling splines on said support and on said casing which engage one another to mount said casing on said support.

4. The arrangement as defined in claim 1, wherein said mounting means includes threaded connecting portions of said support and of said casing which are threadedly connected to one another to mount said casing on said support.

5. The arrangement as defined in claim 1; further comprising an electric connecting member connected to said detecting means; and wherein said casing has a through opening therein for the passage of said electric connecting member therethrough to the exterior of said casing.

6. The arrangement as defined in claim 5, wherein said electric connecting member is a cable; and further comprising means extending from said opening of said casing at the exterior of the latter and operative for receiving said cable.

7. The arrangement as defined in claim 6, wherein said means for receiving said cable includes a tube.

8. The arrangement as defined in claim 7, wherein said support includes a housing having a handgrip portion; and wherein said tube extends at a predetermined distance from said handgrip portion of said housing along the latter so as to serve to protect the hand of the user gripping said handgrip portion.

9. The arrangement as defined in claim 7, wherein said tube has an end portion remote from said opening; and further comprising means for clampingly securing said tube to said support at a region situated between said opening of said casing and said end portion of said tube.

10. An arrangement for mesuring torque transmitted and/or relative angular displacement about an axis, between a driving and a driven member, of which the driving member is rotatably mounted on a support including a housing having a handgrip portion, especially a housing of a power tool such as a power screwdriver, comprising a transducer casing having a through opening; a torsionally deformable member supported in said casing for rotation about a central axis thereof and having two axially spaced end portions; means for so mounting said transducer casing on said support that one of said end portions is connected to the driving member and the other to the driven member; means for influencing magnetic fields in said casing in the vicinity of said deformable member, including two substantially tubular slotted elements of different diameters so mounted one on said one and the other on said other end portion of said torsionally deformable member as to at least partially overlap and surround one another and as to share in the relative angular displacement of said end portions about said central axis when said torsionally deformable member is subjected to torsion; means for detecting magnetic field changes in said casing resulting from the relative angular displacement of said slotted elements; an electric cable connected to said detecting means and passing through said opening in said casing to the exterior of said casing; means for receiving said cable, including a tube extending from said opening of said casing at the exterior of the latter and at a predetermined distance from said handgrip portion of said housing along the latter so as to serve to protect the hand of the user gripping said handgrip portion, and having an end portion remote from said opening; a sleeve-shaped member mounted on said end portion of said tube; a bracket connected to said support and to said sleeve-shaped member to support the latter on said support; and an electric receptacle mounted on said sleeve-shaped member, electrically connected to said cable, and operative for receiving a plug of an additional cable leading away from the arrangement.

* * * * *